No. 705,689. Patented July 29, 1902.
W. V. MAGEE.
ADJUSTABLE HANDLE FOR GARDEN TOOLS.
(Application filed Mar. 15, 1902.)
(No Model.)
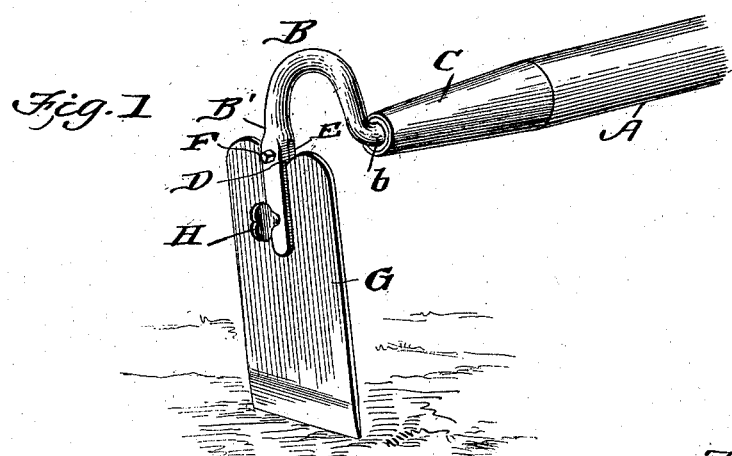
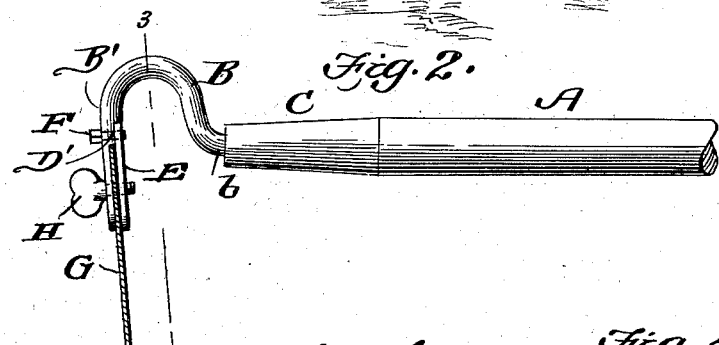
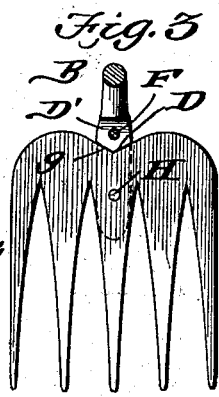
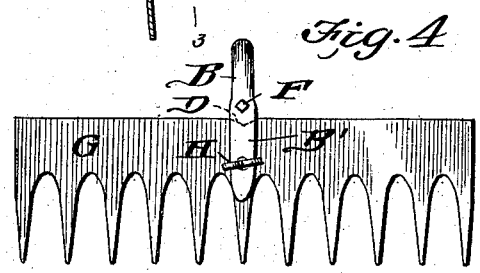
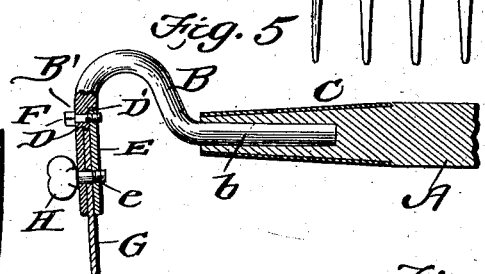
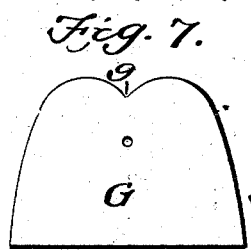
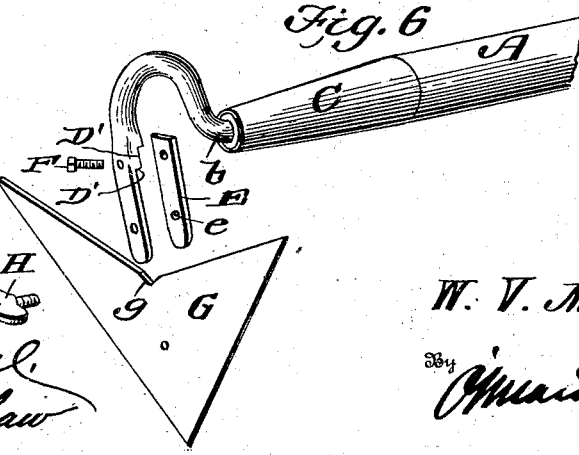
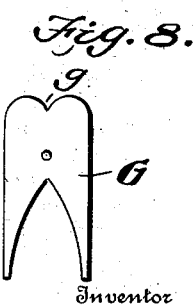
Witnesses
M. Blondel
Clarence Shaw
Inventor
W. V. Magee.
By
Attorneys

UNITED STATES PATENT OFFICE.

WILLIAM VICTOR MAGEE, OF HARVEY, NORTH DAKOTA, ASSIGNOR OF ONE-HALF TO ROBERT J. PRATT, OF HARVEY, NORTH DAKOTA.

ADJUSTABLE HANDLE FOR GARDEN-TOOLS.

SPECIFICATION forming part of Letters Patent No. 705,689, dated July 29, 1902.

Application filed March 15, 1902. Serial No. 98,385. (No model.)

*To all whom it may concern:*

Be it known that I, WILLIAM VICTOR MAGEE, a citizen of the United States, residing at Harvey, in the county of Wells and State of North Dakota, have invented a new and useful Adjustable Handle for Garden-Tools, of which the following is a specification.

This invention is an improvement in garden-tools, and has primarily for its object to provide a simple, cheap, and durable handle to and from which various styles of garden implements may be readily and quickly attached or detached, so that only one handle will be required for a set of various forms of tools which go to make a complete garden set.

With the above object in view my invention comprises a handle-section having a gooseneck-shaped head attached thereto whose free end is provided with a spring clamping-jaw, to which any one of a set of garden implements may be attached.

My invention also consists in certain details of construction and novelties of combination and arrangement of parts, as will be fully described in the following specification and pointed out in the claims, reference being had to the drawings, in which—

Figure 1 is a perspective view of my improvement as applied to an onion-hoe blade. Fig. 2 is a side elevation of the handle-section, showing the blade in section. Fig. 3 is a sectional view on about the line 3 3 of Fig. 2, showing a potato-hoe blade in position upon the handle-section, the spring-plate being removed to clearly illustrate the relative positions of the blade and head. Fig. 4 is a front elevation of my improvement, showing a rake applied to the head. Fig. 5 is a sectional elevation of Fig. 4. Fig. 6 is a detail perspective view of the handle and head, showing the spring-bar, blade, and screw detached, the blade in this view representing a weeding-hoe blade. Figs. 7 and 8 are detail face views of a corn and fork hoe blade, respectively.

In carrying out my invention I employ a handle A, having a gooseneck-shaped head B arranged at one end thereof, the shank $b$ of said head being retained in the end of the handle by a sleeve or thimble C. The downwardly-projecting member B' of the head is cut out upon its inner surface, providing a shoulder D and a seat portion D', respectively, upon the latter of which is adapted to rest one end of a spring clamping-bar E, which is securely held to the member B' by a screw or bolt F, and between the spring clamping-bar E and member B' is securely held one of a series of garden-tools G.

Each tool or blade is provided upon its upper edge with a notch or recess $g$, which is adapted to engage the shoulder D, formed upon the rear side of the member B', and when a suitable blade or implement is thus inserted between the member B' and bar E it is securely clamped in position by a set-screw H, which passes through the member B', blade G, and engages a threaded aperture $e$ in the bar E. When a blade is thus clamped in position, it will be securely and firmly held against lateral or vertical movement.

It will thus be seen that I provide an exceedingly simple, cheap, and durable device to which any one of a series of tools may be quickly and easily applied, and to facilitate the operation of attachment or detachment of a blade I prefer to provide a clamping-screw, as shown in the drawings, although it will of course be understood that any form of bolt may be used, if desired.

Having thus fully described my invention, what I claim as new, and desire to secure by Letters Patent of the United States, is—

1. A garden-tool, comprising a handle having a head connected therewith, the said head having a shoulder formed thereon, a spring-bar connected to the head adjacent to the shoulder, a blade having a notch in which the said shoulder fits, and means for clamping the blade to the head, substantially as shown and described.

2. A garden-tool comprising a handle, having a head connected therewith, the said head comprising a shank member and an upwardly and downwardly projecting portion, the said downwardly-projecting portion being cut out upon its rear surface to provide a shoulder and a seat portion respectively, a spring-bar held to the said seat portion, a blade arranged between the said downwardly-projecting portion and spring-bar and having a notch formed therein that is adapted to be engaged by the said shoulder, and a screw for engaging the said downwardly-projecting portion, blade and spring-bar, substantially as shown and for the purpose described.

3. The combination with a shank having a depending portion, the inner face of which is cut away providing a shoulder and a seat, of a clamping-plate secured at its upper end upon the seat, a tool-blade adapted to be inserted between the depending portion of the shank and the clamping-plate, and having a notch in its upper edge adapted to engage the shoulder, and means for securing the said tool between the downwardly-projecting portion of the shank and bar, substantially as shown and described.

WILLIAM VICTOR MAGEE.

Witnesses:
AUGUST PETERSON,
A. E. SWANSON.